(12) United States Patent
Kim et al.

(10) Patent No.: US 6,959,987 B2
(45) Date of Patent: Nov. 1, 2005

(54) PIVOTABLE SUNSHADE CLIP FOR SPECTACLES

(76) Inventors: Kwang Nam Kim, #110-1302, Hyosung-town, 1071 Bongduk-Dong, Nam-Gu, Daegu (KR); Kyung Nam Kim, 101-408, Dusung-town, Byummul-Dong, Susung-Gu, Daegu (KR)

( * ) Notice: Subject to any disclaimer, the term of this patent is extended or adjusted under 35 U.S.C. 154(b) by 0 days.

(21) Appl. No.: 10/864,867

(22) Filed: Jun. 10, 2004

(65) Prior Publication Data

US 2005/0195357 A1    Sep. 8, 2005

(30) Foreign Application Priority Data

Mar. 3, 2004   (KR) ..................... 20-2004-0005647

(51) Int. Cl.⁷ .............................................. G02C 9/00
(52) U.S. Cl. ........................................ 351/47; 351/57
(58) Field of Search .......................... 351/47, 48, 57, 351/58, 44, 41

(56) References Cited

U.S. PATENT DOCUMENTS

| | | | | |
|---|---|---|---|---|
| 6,089,708 A | * | 7/2000 | Ku | 351/47 |
| 6,352,342 B1 | * | 3/2002 | Huang | 351/47 |
| 6,488,372 B1 | * | 12/2002 | Park | 351/47 |
| 6,729,722 B1 | * | 5/2004 | Park | 351/47 |
| 6,783,234 B1 | * | 8/2004 | Hong | 351/47 |

* cited by examiner

Primary Examiner—Hung Xuan Dang
(74) Attorney, Agent, or Firm—Mayer, Brown, Rowe & Maw LLP (57) ABSTRACT

The pivotable sunshade clip comprises a spectacles bridge and a sunshade bridge which are attached to frames of spectacles and the sunshade clip, respectively. Both the bridges are made of the same material as that the frames. The spectacles bridge is centrally provided with a stator having a pair of magnets inserted at front and upper sides thereof, respectively. The sunshade bridge centrally provided with a mover. The mover is adapted be pivoted upward or downward to be magnetically attached to one of the magnets inserted in the stator, thereby maintaining the sunshade clip in an opening or closing position relative to the spectacles. Such mover includes a center stator recess for receiving the stator, and pivot bridge portions located at both sides the stator recess, respectively. Each of the pivot bridge portions has a fitting groove for allowing the spectacles bridge to be fitted therein while forming a pivot center point. The mover also includes a magnet inserted in the stator recess and adapted to be magnetically attracted to one of the magnets of the stator.

6 Claims, 8 Drawing Sheets

Fig. 8

PIVOTABLE SUNSHADE CLIP FOR SPECTACLES

BACKGROUND OF THE INVENTION

1. Field of the Invention

The present invention relates to a pivotable sunshade clip, and more particularly to a pivotable sunshade clip for spectacles, which can be easily pivoted upward or downward while it is attached to the spectacles.

2. Description of the Related Art

As a substitute for sunglasses, a sunshade for spectacles is formed in the shape of a clip so that it can be detachably attached to the spectacles if necessary. Such a sunshade clip for spectacles, as well and widely known, takes the form of spectacles having colored lenses, and can be detachably attached to ordinary spectacles by means of permanent magnets.

Figure 1:
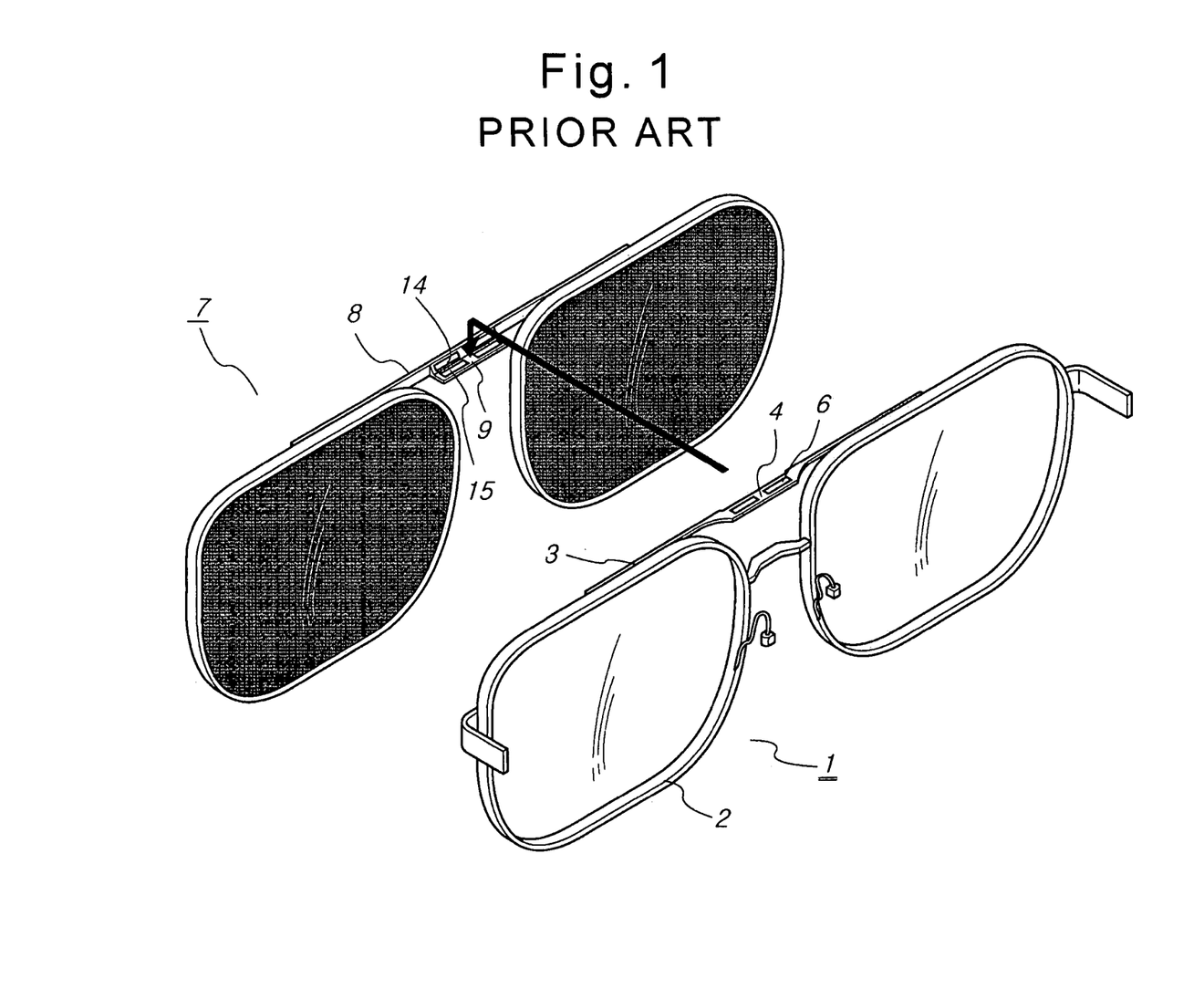
FIG. 1 is a partially broken perspective view illustrating a pivotable sunshade clip in accordance with the prior art.
Figure 2:
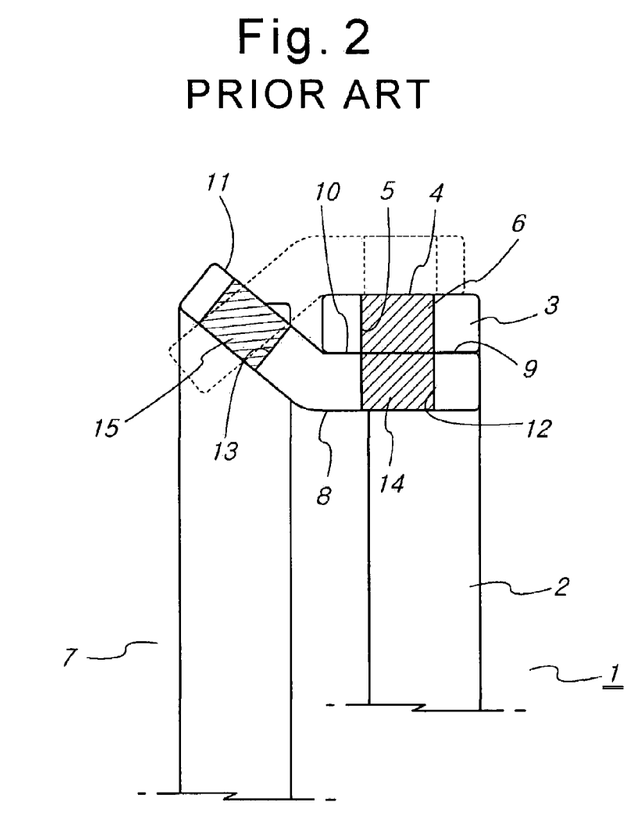
FIG. 2 is a diagrammatic sectional view illustrating the pivotable sunshade clip of the prior art shown in FIG. 1.

Referring to FIGS. 1 and 2 illustrating an example of the prior art, a bridge element 3 is attached to the top of two lens frames 2 of ordinary spectacles 1 so as to connect the lens frames 2 to each other. The bridge element 3 is made of copper, and is centrally formed with a smooth plane portion 4 having an expanded wide area.

The smooth plane portion 4 is formed with a plurality of rectangular magnet holes 5 for the insertion of magnets 6.

Similarly, to a sunshade clip 7, which is to be attached to a front side of the spectacles 1, is attached a bridge element 8. The bridge element 8 is also made of copper, and is centrally formed with a smooth plane portion 9 having an approximately L-shaped section.

One side of the L-shaped smooth plane portion 9 serves as a wearing plane portion 10 formed with a pair of magnet holes 12, whereas the other side thereof serves as an opening plane portion 11 formed with a pair of magnet holes 13. Into these magnet holes 12 and 13 are inserted pairs of magnets 14 and 15, respectively. These magnets 14 and 15 are attractable to the magnets 6 of the spectacles 1.

With such a configuration, when it is desired to locate the sunshade clip 7 immediately forward of the spectacles 1 in order to intercept sunlight, the magnets 14 inserted in the wearing plane portion 10 of the sunshade clip 7 are magnetically attached to the magnets 6 of the spectacles 1. On the contrary, when it is desired to open the sunshade clip 7 for the storage thereof, the sunshade clip 7 is pivoted upward so that the magnets 15 of the opening plane portion 11 are magnetically attached to the magnets 6 of the spectacles 1.

The above described conventional sunshade clip 7, however, has a problem in that, since it is pivoted upward or downward while it is attached to the spectacles only by means of magnetic attraction between the magnets 14 or 15 and 6, it is liable to be unintentionally separated from the spectacles 1 due to external shock or deterioration in magnetic force.

Especially, due to the fact that the bridge elements 3 and 8 are made of copper and thus are considerably heavy, they disadvantageously aggravate the overall weight of the sunshade clip 7, thereby causing a considerable pressure to be exerted upon the face of a wearer, resulting in degradation in wearability thereof.

SUMMARY OF THE INVENTION

Therefore, the present invention has been made in view of the above problems, and it is an object of the present invention to provide a pivotable sunshade clip for spectacles, which can be easily pivoted upward or downward while it is attached to the spectacles so as to secure its opening and closing operations relative to the spectacles, and can prevent not only unintentional separation thereof relative to the spectacles but also any unpleasant pressure exerted upon a user by virtue of a weight reduction thereof, thereby improving convenience for users and quality of the sunshade clip and the spectacles.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 3:
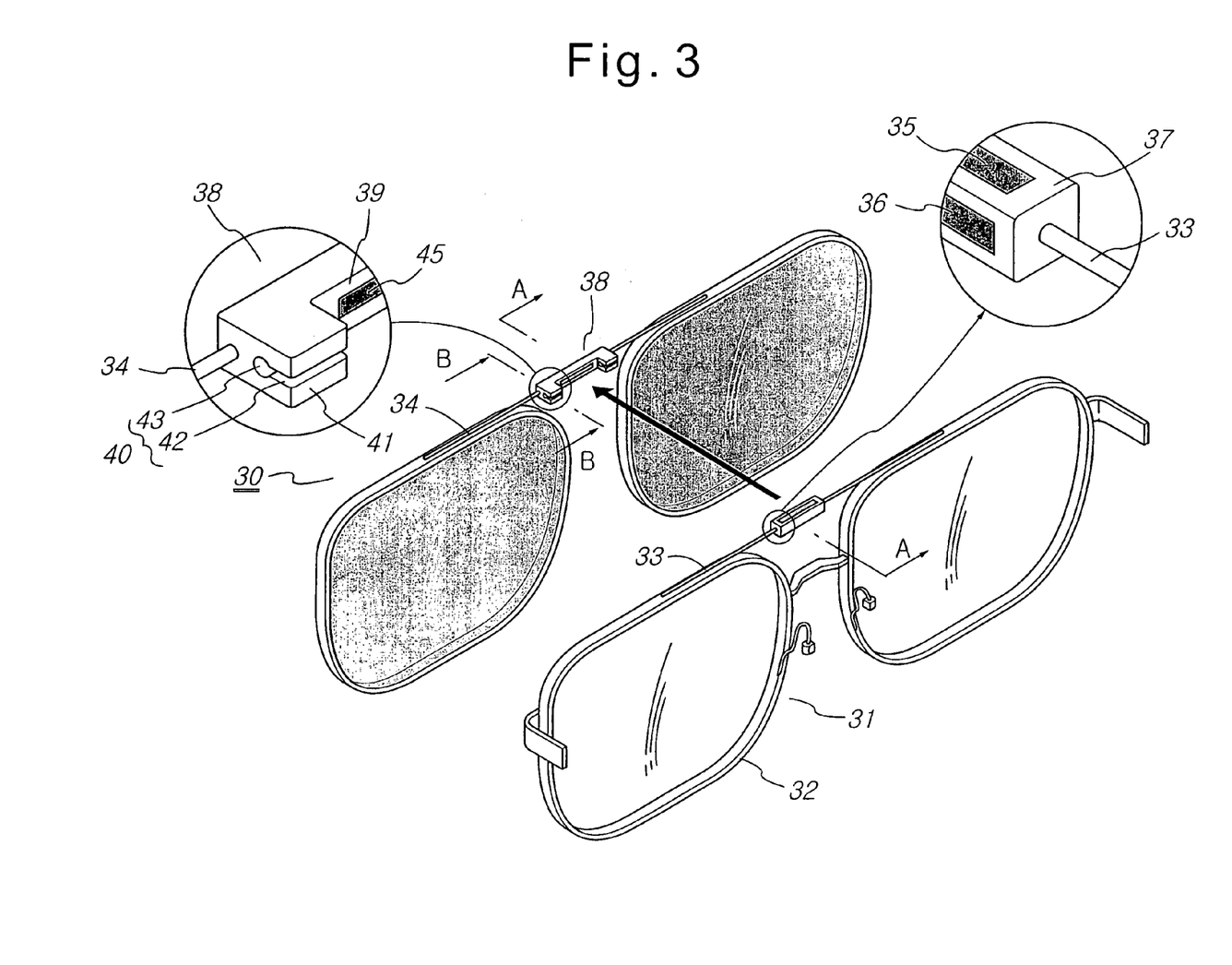
FIG. 3 is a partially broken exploded perspective view illustrating a pivotable sunshade clip in accordance with a preferred embodiment of the present invention.
Figure 4:
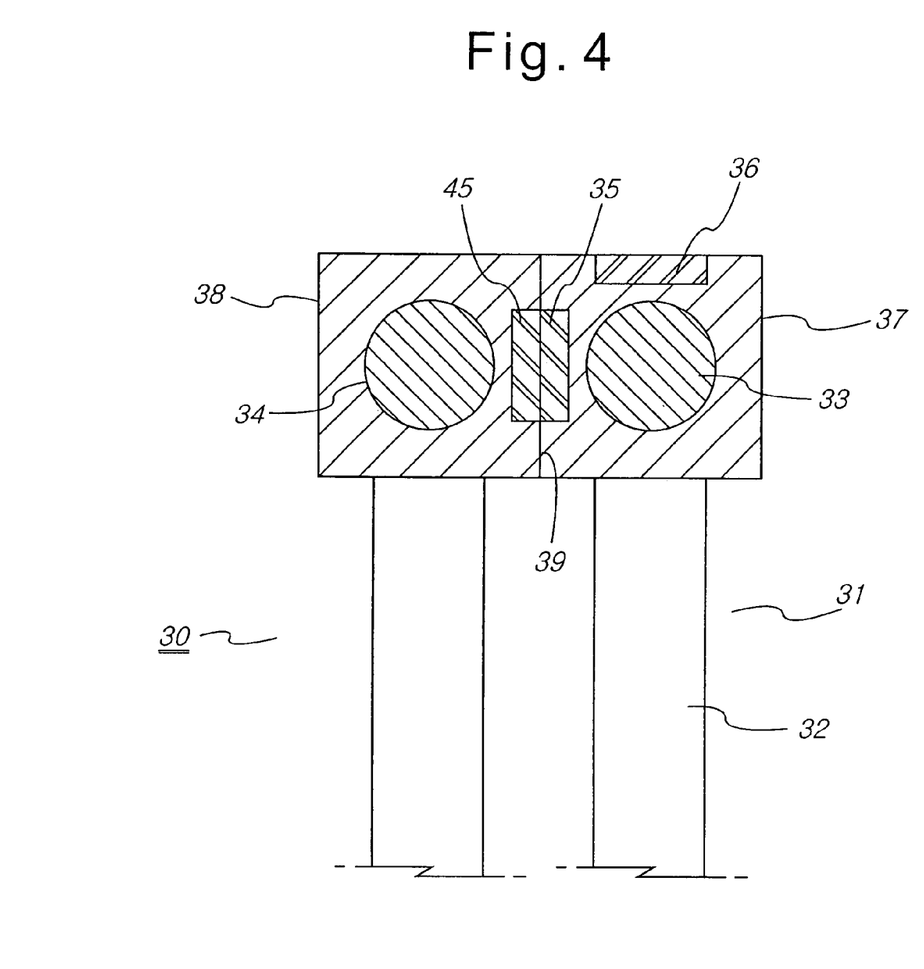
FIG. 4 is a sectional view of the pivotable sunshade clip taken along the line A—A shown in FIG. 3.
Figure 5:
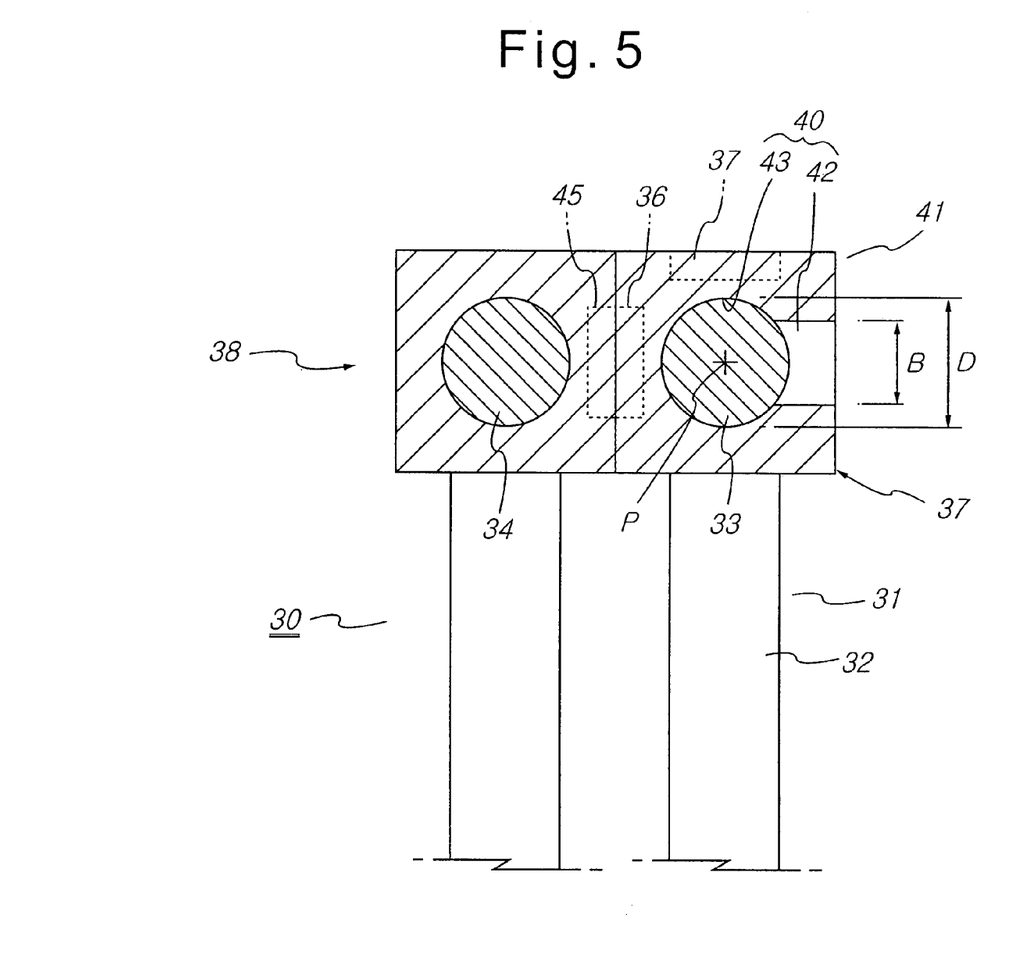
FIG. 5 is a sectional view of the pivotable sunshade clip taken along the line B—B shown in FIG. 3.
Figure 6:
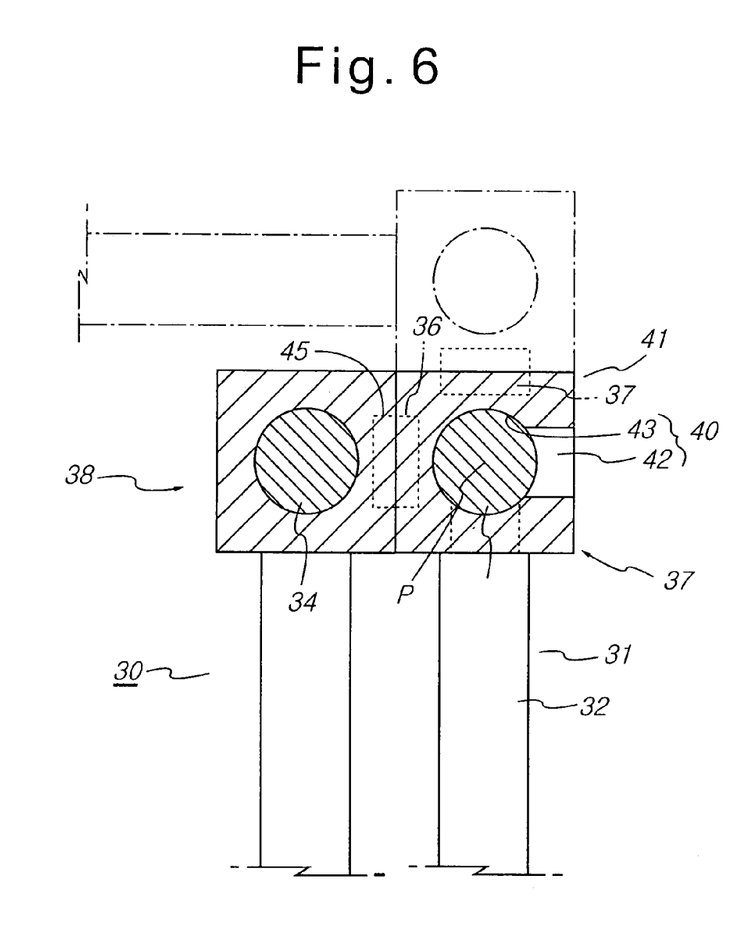
FIG. 6 is a sectional view illustrating the upwardly or downwardly pivoted positions of the pivotable sunshade clip in accordance with the preferred embodiment of the present invention.

FIG. 3 is a partially broken exploded perspective view illustrating a pivotable sunshade clip in accordance with a preferred embodiment of the present invention. FIG. 4 is a sectional view of the pivotable sunshade clip taken along the line A—A shown in FIG. 3. FIG. 5 is a sectional view of the pivotable sunshade clip taken along the line B—B shown in FIG. 3. FIG. 6 is a sectional view illustrating the upwardly or downwardly pivoted positions of the pivotable sunshade clip in accordance with the preferred embodiment of the present invention.

Referring to the aforesaid drawings, the pivotable sunshade clip, which is designated as reference numeral 30, comprises a spectacles bridge 33, and a sunshade bridge 34. These bridges 33 and 34 are made of the same material as that of frames 32 for spectacles 31 and the sunshade clip 30. This has an effect of reducing the overall weight of the sunshade clip 30.

The spectacles bridge 33, attached to the spectacles 31, has a stator 37 provided at a center portion thereof. Inside the stator 37 are inserted magnets 35 and 36 at front and upper sides relative to the spectacles 31.

The sunshade bridge 34, attached to the sunshade clip 30, has a mover 38 at a position corresponding to the stator 37 of the spectacles bridge 33. The mover 38 is adapted to be selectively attached to the magnet 35 or the magnet 36 inserted in the stator 37 as it is pivoted upward or downward, thereby stably maintaining the sunshade clip 30 in an opening or closing position relative to the spectacles 31.

The mover 38 is centrally defined with a stator recess 39 for securely receiving the stator 37. At both sides of the stator recess 39 are provided a pair of pivot bridge portions 41, respectively. The pivot bridge portions 41 are formed with fitting grooves 40, respectively, for allowing the spectacles bridge 33 to be fitted therein while forming a pivot center point (P).

Each of the fitting grooves 40 is divided into an entrance region 42, and a pivot hole region 43. The entrance region 42 has a width (B) smaller than a diameter (D) of the spectacles bridge 33 for the interference fit of the spectacles bridge 33 therein, thereby eliminating risk of unintentional separation of the spectacles bridge 33 after its interference fit. The pivot hole region 43, which is located inward of the entrance region 42, has the same diameter as the diameter (D) of the spectacles bridge 33.

The stator recess 39 has a magnet 45, which is centrally inserted at a position corresponding to the magnets 35 and 36 centrally inserted in the stator 37 of the spectacles 31 so as to be magnetically attached to the magnet 35 or 36.

Although it is exemplarily shown in the drawings that the stator 37 and the mover 38 have a rectangular shape, respectively, it should be noted that they may have various shapes including circular or polygonal, and are preferably made of light materials capable of relieving a pressure to be exerted upon the wearer.

Alternatively, the stator 37 and the mover 38, along with the bridges 33 and 34, may be formed through injection molding of synthetic resin-based materials, such as plastics, and the magnets 35, 36 and 45 inserted in the stator 37 and the mover 38 are variable in their positions and shapes under the assumption that they secure free movement of the mover 38 relative to the stator 37.

Now, the operation of the sunshade clip 38 will be explained.

In order to couple the sunshade clip 30 to the spectacles 31, first, the spectacles 31 and the sunshade clip 30 are coincided with each other, and then the stator 37 of the spectacles bridge 33 is compressively fitted into the stator recess 39 defined in the mover 38 of the sunshade bridge 34.

In such a coupled state, the pivot bridge portions 41 of the mover 38 protrude toward the spectacles 31 from both sides of the stator recess 39 of the mover 38, and thus the spectacles bridge 33 is positioned close to the entrance regions 42 of the fitting grooves 40 defined in the pivot bridge portions 41. Then, as the spectacles bridge 33 is strongly pushed so as to pass through the entrance regions 42 in an interference fit manner, it is positioned in the pivot hole regions 43.

In this case, the spectacles bridge 33 positioned in the pivot hole regions 43 serves as a pivot center point (P), thereby allowing the mover 38 to be freely pivoted upward or downward about the stator 37 of the spectacles 31. In addition, since the entrance portions 42 have the width (B) smaller than the diameter (D) of the spectacles bridge 33, the spectacles bridge 33 can be stably maintained without risk of unintentional separation thereof.

Moreover, by virtue of the strong magnetic attraction between the magnets 35 and 36 inserted in the front and upper sides of the stator 37 and the magnet 45 inserted in the mover 38, the sunshade clip 30 can be stably maintained when it is not only in an upwardly pivoted state so as to be positioned over the spectacles 31 but also in a downwardly pivoted state so as to be positioned immediately forward of the spectacles 31.

Figure 7:
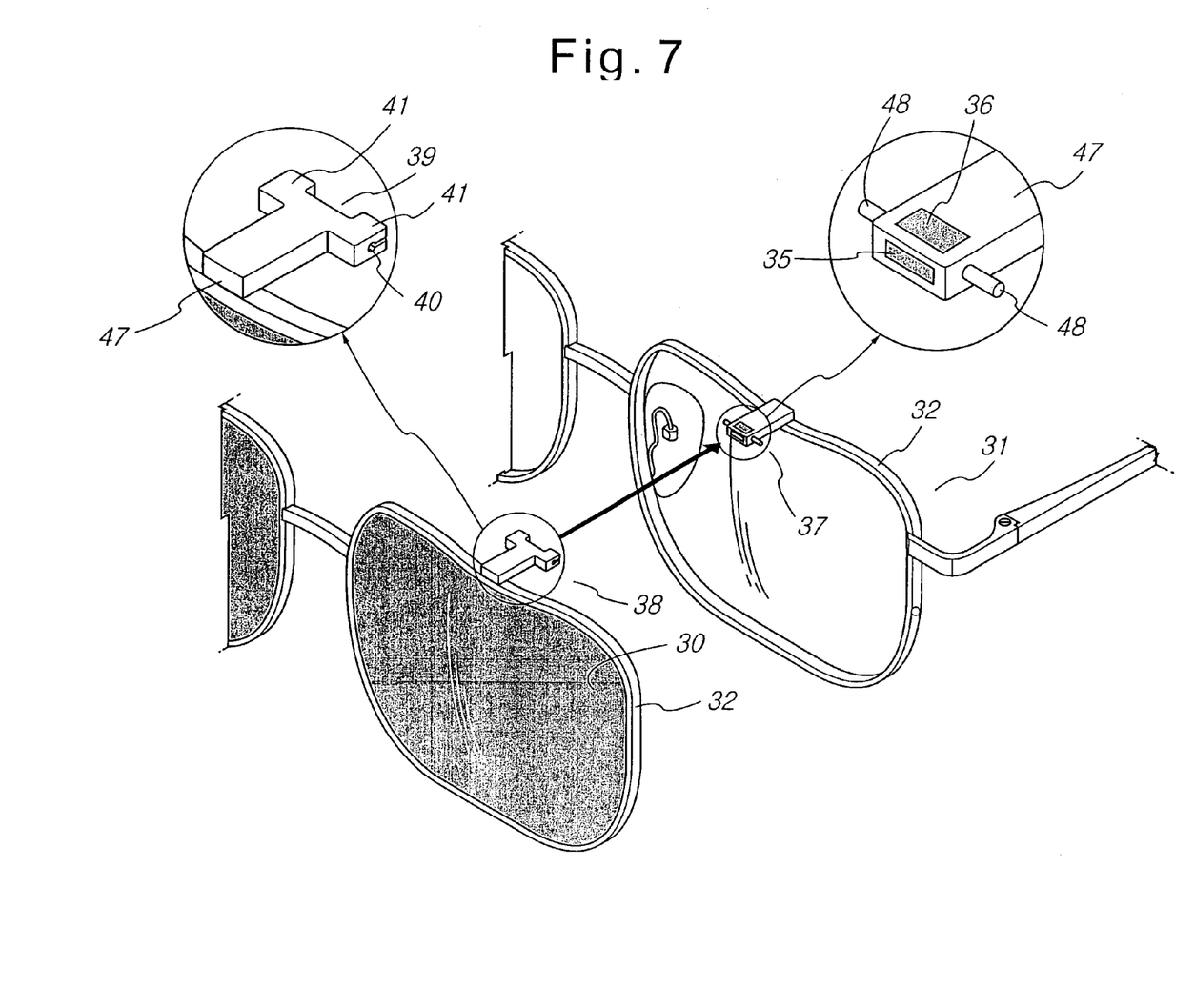
FIG. 7 is a partially broken exploded perspective view illustrating a pivotal sunshade clip in accordance with another preferred embodiment of the present invention.
Figure 8:
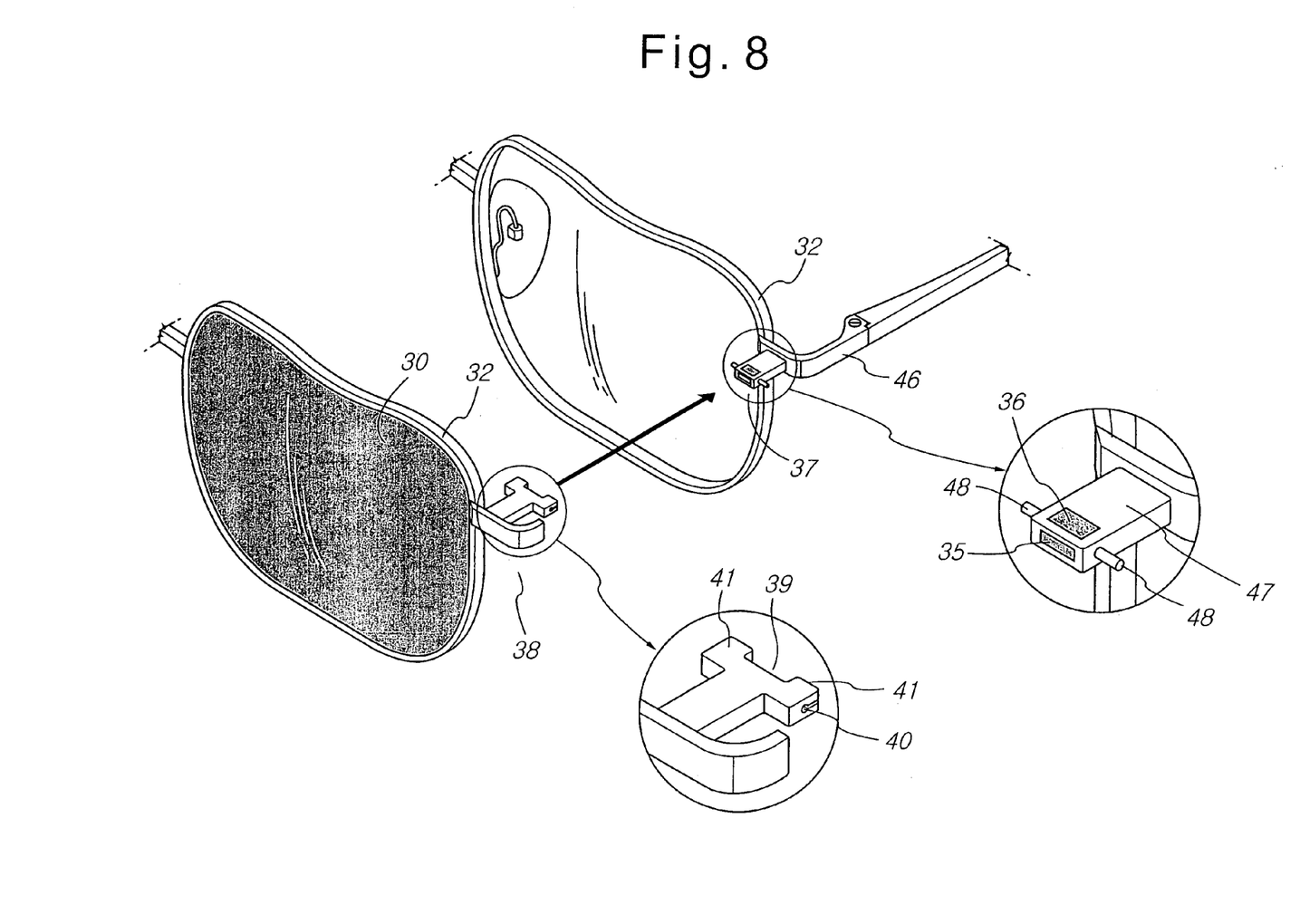
FIG. 8 is a partially broken exploded perspective view illustrating a pivotable sunshade clip in accordance with yet another preferred embodiment of the present invention.

Now, considering other preferred embodiments of the present invention with reference to FIGS. 7 and 8, instead of providing the stator 37 and the mover 38 to the bridges 33 and 34 attached to the spectacles 31 and the sunshade clip 30, respectively, a pair of stators 37' are directly attached to the frames 32 or hinges 46 of the spectacles 31, respectively, and a pair of movers 38' are directly attached to the frames 32 or hinges 46 of the sunshade clip 30, respectively.

For this, to the stators 37' of the spectacles 31 and the movers 38' of the sunshade clip 30 are integrally formed fixing bars 47, respectively. The fixing bars 47 of the stators 37' are extended rearward from the stators 37' to the spectacles 31, whereas the fixing bars 47 of the movers 38' are extended forward from the movers 38' to the sunshade clip 30. These fixing bars 47 are securely fixed to the frames 32 or hinges 46, for example, through welding or screw fastening.

Each of the stators 37' has a pair of pivot shafts 48, which protrude outward from both lateral surfaces of the stator 37', and are inserted into the fitting grooves 40 formed in an associated one of the movers 38'.

In the sunshade clip according to the above-described embodiments of the present invention, means for allowing the sunshade clip to be pivoted upward or downward relative to the spectacles are much leaner and lighter, whereby the spectacles and the sunshade clip can be enhanced not only in aesthetic appearances thereof but also in wearability thereof, resulting in improvements in convenience for users and quality of the sunshade clip and the spectacles.

As apparent from the above description, the present invention provides a pivotable sunshade clip for spectacles, which can be easily pivoted upward or downward while it is attached to the spectacles, and can prevent not only unintentional separation thereof relative to the spectacles but also any unpleasant pressure exerted upon the wearer by virtue of a weight reduction thereof, thereby improving convenience for users and quality of the sunshade clip and the spectacles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pivotable sunshade clip comprising:
   a spectacles bridge and a sunshade bridge which are mounted to frames of spectacles and the sunshade clip, respectively, both the bridges being made of the same material as that of the frames;
   a stator centrally provided at the spectacles bridge, the stator having a pair of magnets inserted at front and upper sides thereof, respectively;
   a mover centrally provided at the sunshade bridge, the mover being pivoted upward or downward to be magnetically attached to one of the magnets inserted in the stator, thereby maintaining the sunshade clip in an opening or closing position relative to the spectacles;
   wherein the mover includes:
   a center stator recess for receiving the stator;
   pivot bridge portions located at both sides of the stator recess, respectively, each of the pivot bridge portions having a fitting groove for allowing the spectacles bridge to be fitted therein while forming a pivot center point; and a magnet inserted in the stator recess and adapted to be magnetically attracted to one of the magnets of the stator.

2. The sunshade clip as set forth in claim 1, wherein the fitting groove has:
- an entrance region having a width smaller than a diameter of the spectacles bridge for securing interference fit of the spectacles bridge and preventing unintentional separation thereof; and
- a pivot hole region positioned inward of the entrance region and having the same diameter as the diameter of the spectacles bridge.

3. The sunshade clip as set forth in claim 1, wherein the stator and the mover are made of light materials capable of relieving a pressure to be exerted upon a wearer.

4. The sunshade clip as set forth in claim 1, wherein the magnets inserted in the stator and the mover are variable in their positions and shapes under the assumption that they secure free movement of the mover relative to the stator.

5. A pivotable sunshade clip comprising:
- a pair of spectacles fixing bars made of the same material as that of frames of spectacles;
- a pair of stators integrally extending from the spectacles fixing bars, respectively, each stator having a pair of magnets inserted at front and upper sides thereof, respectively;
- a pair of sunshade fixing bars made of the same material as that of frames of the sunshade clip; and
- a pair of movers integrally extending from the sunshade fixing bars, respectively, each mover having a stator recess for receiving an associated one of the stators, and pivot bridge portions located at both sides of the stator recess;
- wherein each of the stators has a pair of pivot shafts protruding outward from both lateral surfaces of the stator, the pivot shafts being pivotably fitted into fitting grooves formed in the pivot bridge portions of an associated one of the movers.

6. The sunshade clip as set forth in claim 5, wherein the fixing bars of the stators and the movers are fixed to the frames or hinges of the spectacles and the sunshade clip, respectively.

* * * * *